United States Patent
Xiao et al.

(10) Patent No.: US 10,795,629 B2
(45) Date of Patent: Oct. 6, 2020

(54) TEXT AND CUSTOM FORMAT INFORMATION PROCESSING METHOD, CLIENT, SERVER, AND COMPUTER-READABLE STORAGE MEDIUM

(71) Applicant: TENCENT TECHNOLOGY (SHENZHEN) COMPANY LIMITED, Shenzhen (CN)

(72) Inventors: Siyu Xiao, Shenzhen (CN); Xiaoyu Yu, Shenzhen (CN); Mengsha Zhou, Shenzhen (CN); Jiongchao Lin, Shenzhen (CN); Libin Ren, Shenzhen (CN); Yongjie Li, Shenzhen (CN); Zheng Dai, Shenzhen (CN); Yi Gao, Shenzhen (CN); Duokai Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 99 days.

(21) Appl. No.: 15/664,263

(22) Filed: Jul. 31, 2017

(65) Prior Publication Data

US 2017/0329565 A1  Nov. 16, 2017

Related U.S. Application Data

(63) Continuation of application No. PCT/CN2016/071177, filed on Jan. 18, 2016.

(30) Foreign Application Priority Data

Feb. 5, 2015  (CN) .......................... 2015 1 0063805

(51) Int. Cl.
*G06F 9/48* (2006.01)
*G06F 3/14* (2006.01)
(Continued)

(52) U.S. Cl.
CPC ................ *G06F 3/14* (2013.01); *G06F 9/451* (2018.02); *G06F 21/31* (2013.01); *H04L 12/00* (2013.01);
(Continued)

(58) Field of Classification Search
CPC . G06F 3/14; G06F 9/451; G06F 21/31; G06F 40/103; G06F 40/205;
(Continued)

(56) References Cited

U.S. PATENT DOCUMENTS 7,263,526 B1 * 8/2007 Busey ................. H04L 12/1813
2002/0126135 A1 * 9/2002 Ball ......................... G06F 3/14
345/600

(Continued)

FOREIGN PATENT DOCUMENTS

CN  1777186 A  5/2006
CN  102158431 A  8/2011
(Continued)

OTHER PUBLICATIONS

International Search Report in international application No. PCT/CN2016/071177, dated Apr. 22, 2016.
(Continued)

*Primary Examiner* — Jennifer N To
*Assistant Examiner* — K C Chen
(74) *Attorney, Agent, or Firm* — Syncoda LLC; Feng Ma

(57) ABSTRACT

After a user logs in to a client, a first request of the user is sent to a server, and after the first request is authenticated, a communication connection between the client and the server is established; a system message sent by the server is received in a user login interface to which the user has logged in; the system message is generated by the server to contain at least text-format information capable of being displayed at the client.

7 Claims, 10 Drawing Sheets

(51) Int. Cl.
*H04L 29/06* (2006.01)
*H04L 12/00* (2006.01)
*G06F 9/451* (2018.01)
*G06F 21/31* (2013.01)
*H04L 29/08* (2006.01)
*G06F 40/103* (2020.01)
*G06F 40/205* (2020.01)
*G06F 3/0484* (2013.01)

(52) U.S. Cl.
CPC .......... *H04L 29/06* (2013.01); *H04L 63/0892* (2013.01); *H04L 67/36* (2013.01); *G06F 3/04842* (2013.01); *G06F 40/103* (2020.01); *G06F 40/205* (2020.01); *G06F 2221/2101* (2013.01); *H04L 67/2814* (2013.01)

(58) Field of Classification Search
CPC ......... G06F 3/04842; G06F 2221/2101; H04L 12/00; H04L 29/06; H04L 63/0892; H04L 67/36; H04L 67/2814
See application file for complete search history.

(56) References Cited

U.S. PATENT DOCUMENTS

| | | | |
|---|---|---|---|
| 2005/0021624 | A1 | 1/2005 | Herf |
| 2012/0023113 | A1* | 1/2012 | Ferren ................ G06F 16/9535 707/751 |
| 2012/0150729 | A1* | 6/2012 | Isaacson .............. G06Q 10/101 705/39 |
| 2016/0125370 | A1* | 5/2016 | Grassadonia .......... G06Q 20/16 705/39 |

FOREIGN PATENT DOCUMENTS

| | | |
|---|---|---|
| CN | 102447788 A | 5/2012 |
| CN | 104618488 A | 5/2015 |
| WO | 02056566 A1 | 7/2002 |

OTHER PUBLICATIONS

English Translation of the Written Opinion of the International Search Authority in international application No. PCT/CN2016/071177, dated Apr. 22, 2016.
Notification of the First Office Action of Chinese application No. 201510063805.5, dated Feb. 3, 2016.
Notification of the Second Office Action of Chinese application No. 201510063805.5, dated May 5, 2016.

\* cited by examiner

TEXT AND CUSTOM FORMAT INFORMATION PROCESSING METHOD, CLIENT, SERVER, AND COMPUTER-READABLE STORAGE MEDIUM

CROSS-REFERENCE TO RELATED APPLICATIONS

This is a continuation application of International Patent Application No. PCT/CN2016/071177, filed on Jan. 18, 2016, which claims priority to Chinese Application No. 201510063805.5 filed on Feb. 5, 2015, both disclosures being incorporated herein by reference in their entirety.

BACKGROUND

The following technical problems emerge in related art.

With development of internet technology, there comes an era of big data when massive amounts of information constantly spring up. To meet a demand for information sharing by public, information is processed with existing technology based on a social networking tool such as WeChat, Microblogging, etc. A great amount of information may be shared in a social network, with the shared information being displayed in increasingly diversified forms. Different forms of information display may impact efficiency in processing a user operation at a client as well as a result of the user operation. Processing of the user operation at the client may impact how information is transmitted and how information notification is implemented in interaction between the client and a server. The more user operations at the client, the more frequent the interaction between the client and the server is triggered, which may take up a great amount of system resources at both the client side and the server side. The massive amount of interaction may also lead to waste of network bandwidth resources. Besides, a certain form of information display may require third-party involvement to relay information exchange, instead of being based on direct information exchange between the user and the server.

In short, no effective solution exists for minimizing user operations, reducing interaction between a client and a server, and efficiently displaying information without third-party involvement to allow the user to obtain a final result of an operation within a minimal amount of time.

SUMMARY

The disclosure relates to communication technology, and in particular to an information processing method, a client, a server, and a computer-readable storage medium.

In view of this, embodiments herein provide an information processing method, a client, a server, and a computer-readable storage medium capable of solving at least a problem in existing art.

A technical solution according to an embodiment herein may be implemented as follows.

According to an embodiment herein, an information processing method applies to a client and includes steps as follows.

After a user logs in to the client, a first request of the user is sent to a server, and after the first request is authenticated, a communication connection between the client and the server is established.

A system message sent by the server is received in a user login interface to which the user has logged in. The system message is generated by the server to contain at least text-format information capable of being displayed at the client.

According to an embodiment herein, a client includes:

a communication establishing unit configured for: after a user logs in to the client, sending a first request of the user to a server, and after the first request is authenticated, establishing a communication connection between the client and the server; and a receiving unit configured for: receiving, in a user login interface to which the user has logged in, a system message sent by the server. The system message is generated by the server to contain at least text-format information capable of being displayed at the client.

The communication establishing unit and the receiving unit may be implemented by a Central Processing Unit (CPU), a Digital Signal Processor (DSP) or a Field-Programmable Gate Array (FPGA).

According to an embodiment herein, an information processing method applies to a server and includes steps as follows.

A first request sent by a client is received, and after the first request is authenticated, a communication connection between the client and the server is established.

A system message containing at least text-format information capable of being displayed at the client is generated.

The system message is sent to the client.

According to an embodiment herein, a server includes:

an authenticating unit configured for: receiving a first request sent by a client, authenticating the first request, and establishing a communication connection between the client and the server;

a generating unit configured for: generating a system message containing at least text-format information capable of being displayed at the client; and a sending unit configured for: sending the system message to the client.

The authenticating unit, the generating unit and the sending unit may be implemented by a Central Processing Unit (CPU), a Digital Signal Processor (DSP) or a Field-Programmable Gate Array (FPGA).

According to an embodiment herein, a non-transitory computer-readable storage medium has stored therein computer-executable instructions that, when executed by a processor, cause the processor to execute the information processing method.

With an information processing method according to an embodiment herein, after a user logs in to the client, a first request of the user is sent to a server, and after the first request is authenticated, a communication connection between the client and the server is established; a system message sent by the server is received in a user login interface to which the user has logged in; the system message is generated by the server to contain at least text-format information capable of being displayed at the client.

With an embodiment herein, a server generates a system message, and issues the generated system message to a client, where the system message is parsed and directly displayed before the user, without requiring additional third-party relay before information can be displayed, thereby saving resources, improving efficiency in pushing information to a user, meeting a demand for fast direct display of a result; information may be directly received in the user login interface, and the information displayed in its final form may be viewed, without the need to receive the information by jumping from the user login interface to another page as prompted by a notification, thereby saving resources, avoiding multi-stage user operations at the client and multiple interactions between the client and the server, allowing the user to obtain a final result of an operation within a minimal amount of time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Implementation of a technical solution herein will be further elaborated below with reference to the drawings.

Method Embodiment 1

Figure 1:
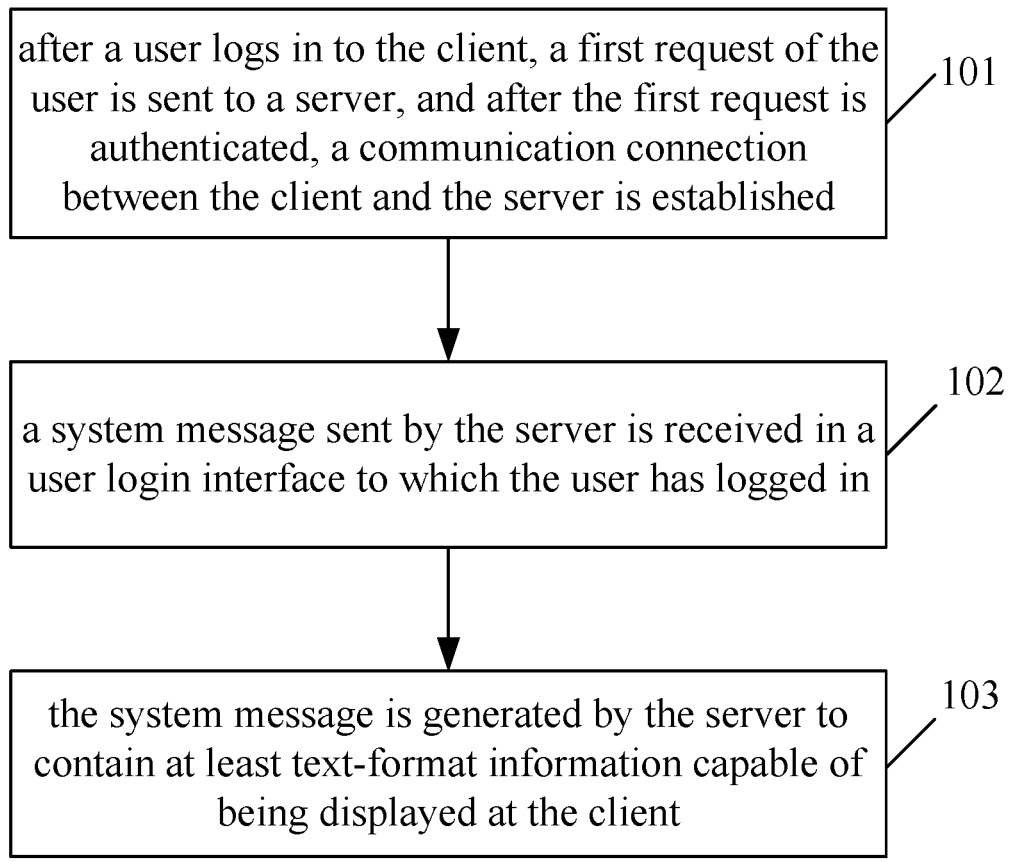
FIG. 1 is a flowchart of a Method Embodiment 1 herein.

As shown in FIG. 1, an information processing method according to an embodiment herein applies to a client. The method includes steps as follows.

In step 101, after a user logs in to the client, a first request of the user is sent to a server, and after the first request is authenticated, a communication connection between the client and the server is established.

The first request may be a login request. When a first user has logged in to the client with an account number and a password, and has not logged out the next time the first user uses the client, interaction between the client and the server may be started directly using the established communication connection without requiring the first user to log in again. In this case, this step may be omitted.

In step 102, a system message sent by the server is received in a user login interface to which the user has logged in.

In step 103, the system message is generated by the server to contain at least text-format information capable of being displayed at the client.

According to an embodiment herein, a communication connection between the client and the server is established in step 101; in steps 102-103, information may be directly received in the user login interface, and the information displayed in its final form may be viewed, without the need to receive the information by jumping from the user login interface to another page as prompted by a notification, thereby saving resources, avoiding multi-stage user operations at the client and the server, allowing the user to obtain a final result of an operation within a minimal amount of time. Moreover, the client receives a system message directly sent by the server containing at least text-format information capable of being displayed at the client. Unlike a system message supporting but plain text information, the system message according to an embodiment herein may be constructed to contain a field of a custom tag.

The system message according to an embodiment herein is generated and issued by the server, such that the system message may be directly displayed before the user after being parsed at the client, without requiring additional third-party relay before information can be displayed, thereby saving resources, improving efficiency in pushing information to a user, meeting a demand for fast direct display of a result.

According to an embodiment herein, the system message may further contain custom-format information capable of being displayed at the client, in addition to the text-format information capable of being displayed at the client.

Method Embodiment 2

Figure 2:
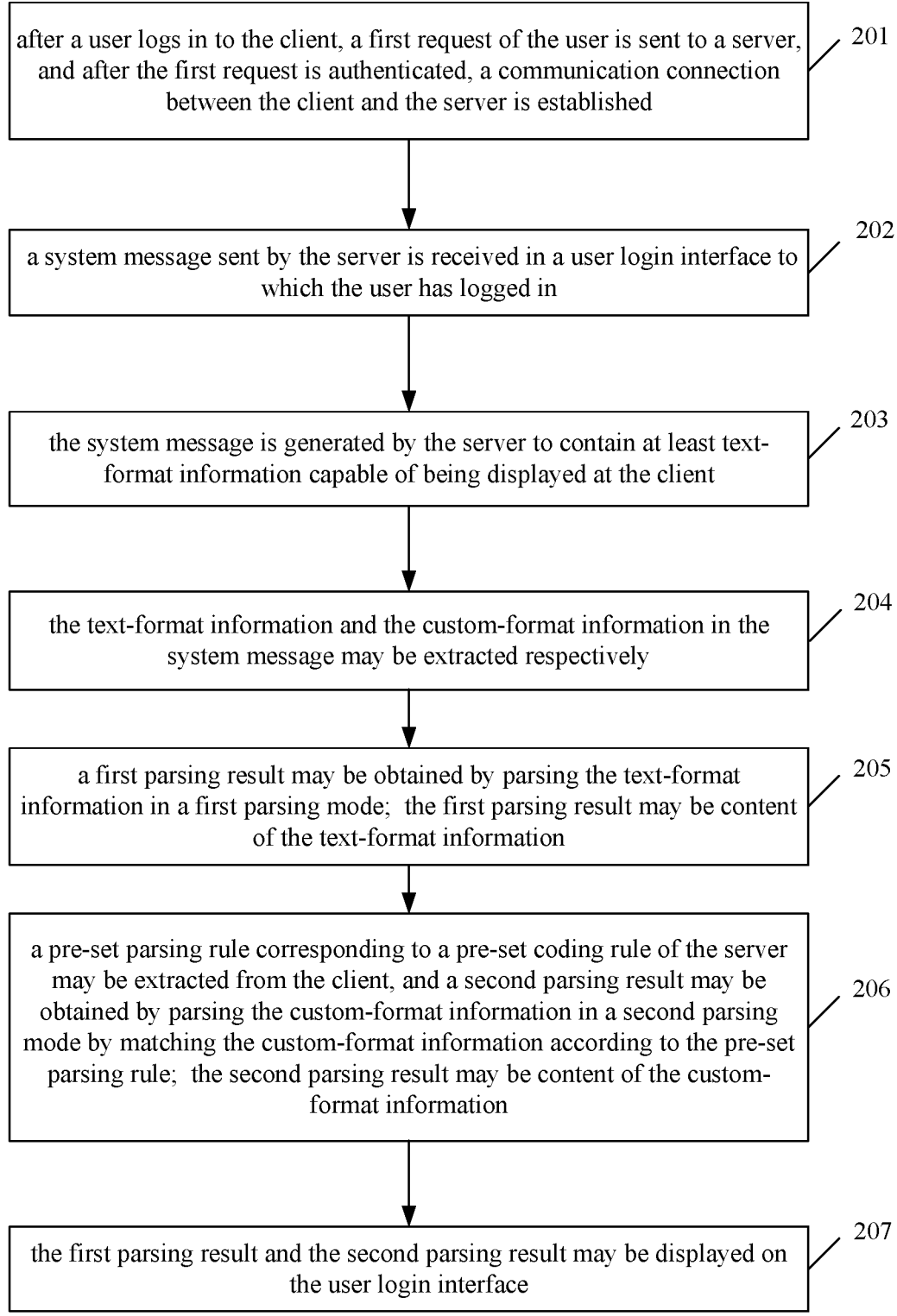
FIG. 2 is a flowchart of a Method Embodiment 2 herein.

As shown in FIG. 2, an information processing method according to an embodiment herein applies to a client. The method includes steps as follows.

In step 201, after a user logs in to the client, a first request of the user is sent to a server, and after the first request is authenticated, a communication connection between the client and the server is established.

The first request may be a login request. When a first user has logged in to the client with an account number and a password, and has not logged out the next time the first user uses the client, interaction between the client and the server may be started directly using the established communication connection without requiring the first user to log in again. In this case, this step may be omitted.

In step 202, a system message sent by the server is received in a user login interface to which the user has logged in.

In step 203, the system message is generated by the server to contain at least text-format information capable of being displayed at the client.

In step 204, the text-format information and the custom-format information in the system message may be extracted respectively.

In step 205, a first parsing result may be obtained by parsing the text-format information in a first parsing mode; the first parsing result may be content of the text-format information.

Plain text information may be parsed using conventional art for parsing text information.

In step 206, a pre-set parsing rule corresponding to a pre-set coding rule of the server may be extracted from the client, and a second parsing result may be obtained by parsing the custom-format information in a second parsing mode by matching the custom-format information according to the pre-set parsing rule; the second parsing result may be content of the custom-format information.

The custom-format information may be parsed in a second parsing mode by being matched according to the pre-set parsing rule as follows. A beforehand agreement on a matching rule, such as a mapping relation, may be made by the client and the server. For example, the mapping relation may include a relation setting, at both the server and the client, that A=A1, B=B1, C=C1, etc. After receiving a custom tag such as A, B, C, etc., the client may obtain a parsing result such as A1, B1, C1, etc. by matching the custom tag to the mapping relation.

In step 207, the first parsing result and the second parsing result may be displayed on the user login interface.

According to an embodiment herein, a communication connection between the client and the server is established in step 201; in step 202-203, information may be directly received in the user login interface, and the information displayed in its final form may be viewed, without the need to receive the information by jumping from the user login interface to another page as prompted by a notification, thereby saving resources, avoiding multi-stage user operations at the client and multiple interactions between the client and the server, allowing the user to obtain a final result of an operation within a minimal amount of time. Moreover, the client receives a system message directly sent by the server containing at least text-format information capable of being displayed at the client. Unlike a system message supporting but plain text information, the system message according to an embodiment herein may be constructed to contain a field of a custom tag.

The system message according to an embodiment herein is generated and issued by the server, such that the system message may be directly displayed before the user after being parsed at the client, without requiring additional third-party relay before information can be displayed, thereby saving resources, improving efficiency in pushing information to a user, meeting a demand for fast direct display of a result.

In step 204-207, different types of information in the system message may be extracted separately, and be parsed respectively in different parsing modes. The client may parse the custom-format information according to a parsing rule on which the client and the server have agreed beforehand which corresponds to a coding rule, and then display the resulting first parsing result and second parsing result on the user login interface.

According to an embodiment herein, the custom-format information may include at least one of: information on a scene-identifying image and interactive information.

The information on the scene-identifying image may be an ICON of a scene of receiving a WeChat red packet. The interactive information may be an interactive page control supporting entering a page including details of the WeChat red packet, for receiving a user operation to enter the page including details of the WeChat red packet.

According to an embodiment herein, the method may further include steps as follows.

In step 301, the content of the text-format information, the content of the information on the scene-identifying image, and the content of the interactive information obtained by parsing the system message may be displayed on the user login interface.

In step 302, a first operation on the content of the interactive information may be received.

In step 303, in response to the first operation, a jump may be made to jump to a first page indicated by or linked to by the content of the interactive information. The first page may include an introduction to details of shared information, such as a page including details of a WeChat red packet as described in an application scene below.

Client Embodiment 1

Figure 3:
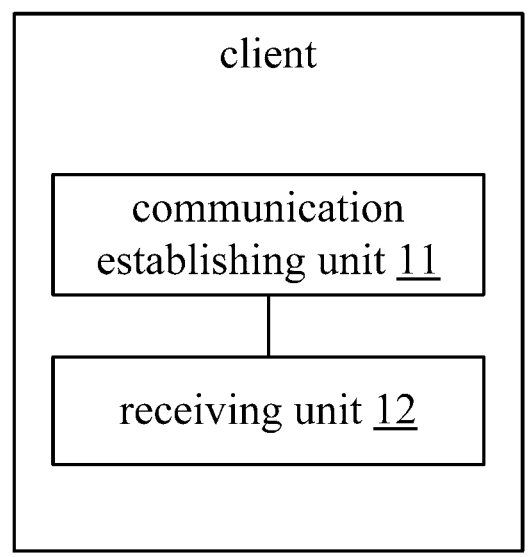
FIG. 3 is a diagram of a structure of a Client Embodiment 1 herein.

As shown in FIG. 3, a client according to an embodiment herein includes a communication establishing unit 11 and a receiving unit 12.

The communication establishing unit 11 is configured for: after a user logs in to the client, sending a first request of the user to a server, and after the first request is authenticated, establishing a communication connection between the client and the server.

The receiving unit 12 is configured for: receiving, in a user login interface to which the user has logged in, a system message sent by the server. The system message is generated by the server to contain at least text-format information capable of being displayed at the client.

According to an embodiment herein, the system message may further contain custom-format information capable of being displayed at the client, in addition to the text-format information capable of being displayed at the client.

According to an embodiment herein, the client may further include an extracting unit, a first parsing unit, a second parsing unit, and a display unit.

The extracting unit may be configured for: acquiring the system message, and respectively extracting the text-format information and the custom-format information in the system message.

The first parsing unit may be configured for: obtaining a first parsing result by parsing the text-format information in a first parsing mode. The first parsing result may be content of the text-format information.

The second parsing unit may be configured for: extracting from the client, a pre-set parsing rule corresponding to a pre-set coding rule of the server, and obtaining a second parsing result by parsing the custom-format information in a second parsing mode by matching the custom-format information according to the pre-set parsing rule. The second parsing result may be content of the custom-format information.

The display unit may be configured for: displaying the first parsing result and the second parsing result on the user login interface.

According to an embodiment herein, the custom-format information may include at least one of: information on a scene-identifying image and interactive information.

According to an embodiment herein, the display unit may be further configured for: displaying, on the user login interface, the content of the text-format information, the content of the information on the scene-identifying image, and the content of the interactive information obtained by parsing the system message.

The client may further include an operation receiving unit and a responding unit.

The operation receiving unit may be configured for: receiving a first operation on the content of the interactive information.

The responding unit may be configured for: jumping, in response to the first operation, to a first page indicated by or linked to by the content of the interactive information. The first page may include an introduction to details of shared information.

Method Embodiment 3

Figure 4:
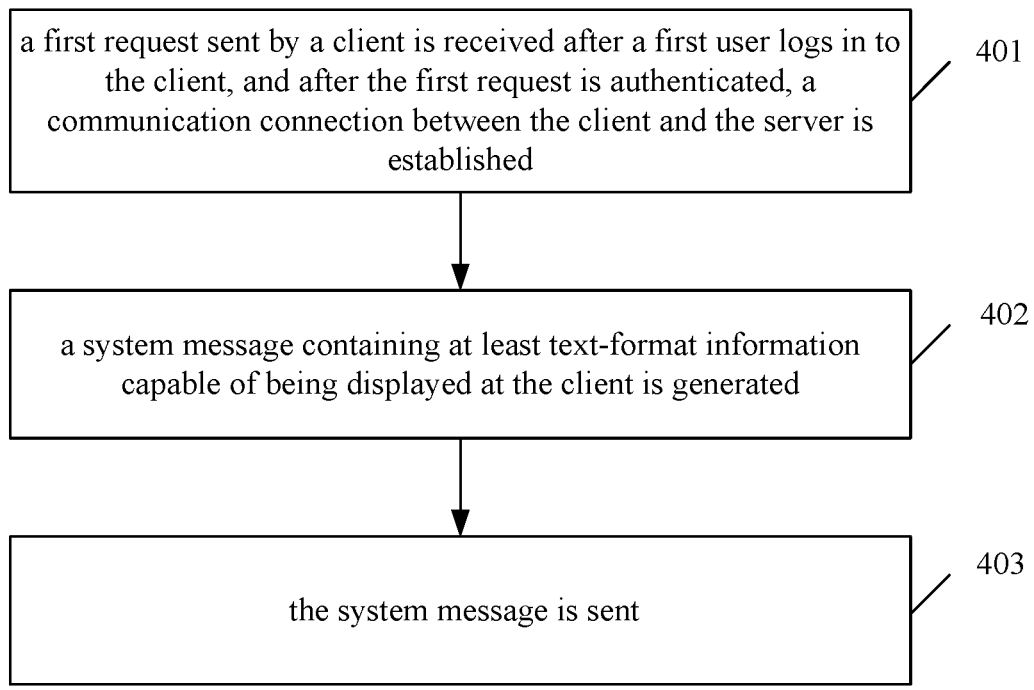
FIG. 4 is a flowchart of a Method Embodiment 3 herein.

As shown in FIG. 4, an information processing method according to an embodiment herein applies to a server. The method includes steps as follows.

In step 401, a first request sent by a client is received after a first user logs in to the client, and after the first request is authenticated, a communication connection between the client and the server is established.

In step 402, a system message containing at least text-format information capable of being displayed at the client is generated.

In step 403, the system message is sent.

According to an embodiment herein, the system message may further contain custom-format information capable of being displayed at the client, in addition to the text-format information capable of being displayed at the client.

According to an embodiment herein, the system message may be generated by steps as follows.

First, content of the text-format information may be acquired, and the text-format information may be generated in a first coding mode corresponding to a first parsing mode.

The first coding mode may include existing text information coding means.

Second, content of the custom-format information may be acquired, a pre-set coding rule may be extracted from the server, and the custom-format information may be generated in a second coding mode. The second coding mode may correspond to a second parsing mode. The pre-set coding rule may correspond to a pre-set parsing rule.

The pre-set coding rule may include a coding rule of a rich text control.

According to an embodiment herein, the custom-format information may include at least one of: information on a scene-identifying image and interactive information.

System Embodiment 1

Figure 5:
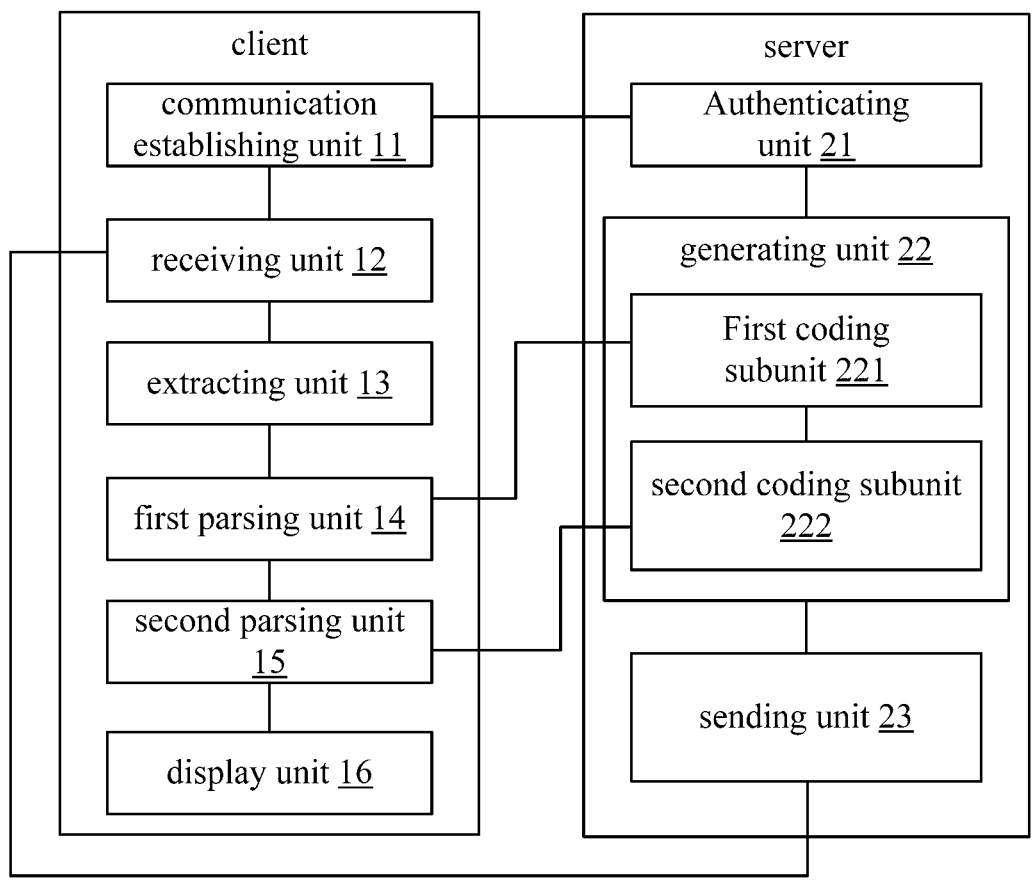
FIG. 5 is a diagram of a structure of a System Embodiment 1 herein.

As shown in FIG. 5, the embodiment herein consists of a client and a server, including a communication establishing unit 11, a receiving unit 12, an extracting unit 13, a first parsing unit 14, a second parsing unit 15, and a display unit 16 at the client, as well as an authenticating unit 21, a generating unit 22, and a sending unit 23 at the server. The generating unit 22 may further include a first coding subunit 221 and a second coding subunit 222.

The communication establishing unit 11 is configured for: after a user logs in to the client, sending a first request of the user to a server, and after the first request is authenticated, establishing a communication connection between the client and the server. The receiving unit 12 is configured for: receiving, in a user login interface to which the user has logged in, a system message sent by the server. The system message is generated by the server to contain at least text-format information capable of being displayed at the client. The extracting unit 13 may be configured for: acquiring the system message, and respectively extracting the text-format information and the custom-format information in the system message. The first parsing unit 14 may be configured for: obtaining a first parsing result by parsing the text-format information in a first parsing mode. The first parsing result may be content of the text-format information. The second parsing unit 15 may be configured for: extracting from the client, a pre-set parsing rule (which may correspond to a pre-set coding rule of the server), and obtaining a second parsing result by parsing the custom-format information in a second parsing mode by matching the custom-format information according to the pre-set parsing rule. The second parsing result may be content of the custom-format information. The display unit 16 may be configured for: displaying the first parsing result and the second parsing result on the user login interface. The authenticating unit 21 may be configured for: receiving a first request sent by a client, authenticating the first request, and establishing a communication connection between the client and the server. The generating unit 22 may be configured for: generating a system message containing at least text-format information capable of being displayed at the client. The sending unit 23 may be configured for: sending the system message (such as to the client). The first coding subunit 222 may be configured for: acquiring content of the text-format information, and generating the text-format information in a first coding mode. The first coding mode may correspond to a first parsing mode. The second coding subunit 222 may be configured for: acquiring content of the custom-format information, extracting from the server, a pre-set coding rule, and generating the custom-format information in a second coding mode. The second coding mode may correspond to a second parsing mode. The pre-set coding rule may correspond to a pre-set parsing rule.

Note that the client may be, but not limited to: electronic equipment such as a Personal Computer (PC); portable electronic equipment such as a PAD, a tablet computer, a laptop, etc.; or a smart mobile terminal such as a mobile phone. The server may be electronic equipment as a cluster system formed by integrated or separate functioning units. The client and the server each may include at least a database for data storage and a processor for data processing, or include a storage medium arranged separately or in a server.

The processor may be implemented with a microprocessor, a Central Processing Unit (CPU), a Digital Signal Processor (DSP), or a Field-Programmable Gate Array (FPGA). The storage medium may include computer-executable operation instructions that, when executed by a processor, cause the processor to execute the information processing method according to an aforementioned embodiment herein.

Figure 6:
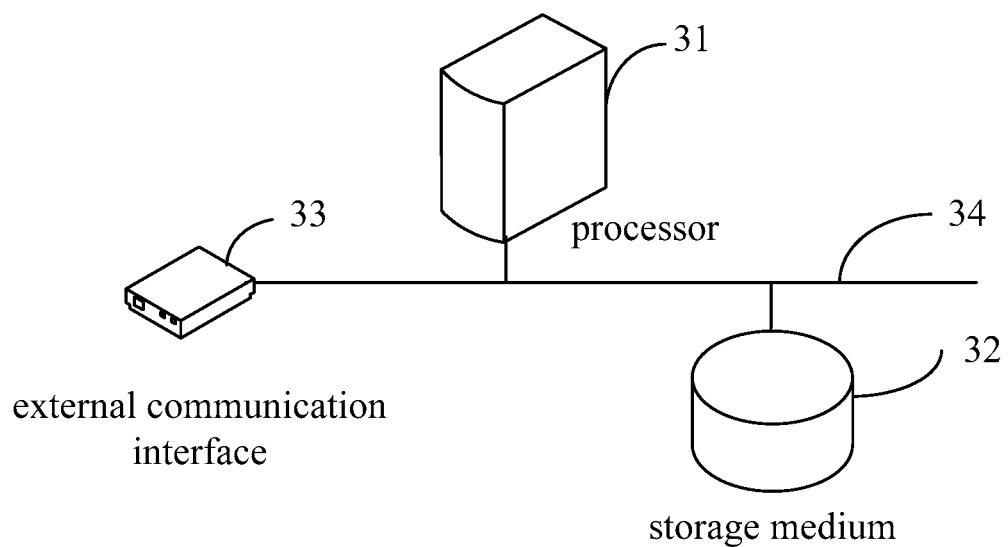
FIG. 6 is a diagram of a hardware entity of a client or a server according to an embodiment herein.

An example of the client (as well as the server) as a hardware entity, as shown in FIG. 6, may include a processor 31, a storage medium 32, and at least one external communication interface 33. The processor 31, the storage medium 32 and the external communication interfaces 33 are connected to each other by a bus 34.

According to an embodiment herein, the system message may further contain custom-format information capable of being displayed at the client, in addition to the text-format information capable of being displayed at the client.

According to an embodiment herein, the custom-format information may include at least one of: information on a scene-identifying image and interactive information.

Note that the above description relating to the client (as well as the server) is similar to that relating to the method, with the same beneficial effect as the method, which is not repeated. One may refer to description in the method embodiments herein for technical details not disclosed for a client or system embodiment herein.

Description is made below with reference to a real application scene as an example.

In a scene to which an embodiment herein applies, with a social network tool such as WeChat, a red-packet system message may be based on a rich text control. The scene may involve a system message and a red-packet-received notification. The system message may refer to a type of message that is issued or sent to a client by a server in WeChat, independent of another user. The red-packet-received notification may refer to a notification received by a red-packet sender after a sent WeChat red packet is received by a receiver, notifying of the receiver and a receiving time of the red packet.

Conventionally, the red-packet-received notification may be implemented as a template message sent to the red-packet sender by a "WeChat red packet" public account of a third party. The template message may be a PUSH-type message. Each time a red packet for an individual receiver is received, a template message will be sent by the public account to notify of the reception. For each of the first three and the last receiving events of a red packet for a group of receivers, a template message will be sent.

Figure 7:
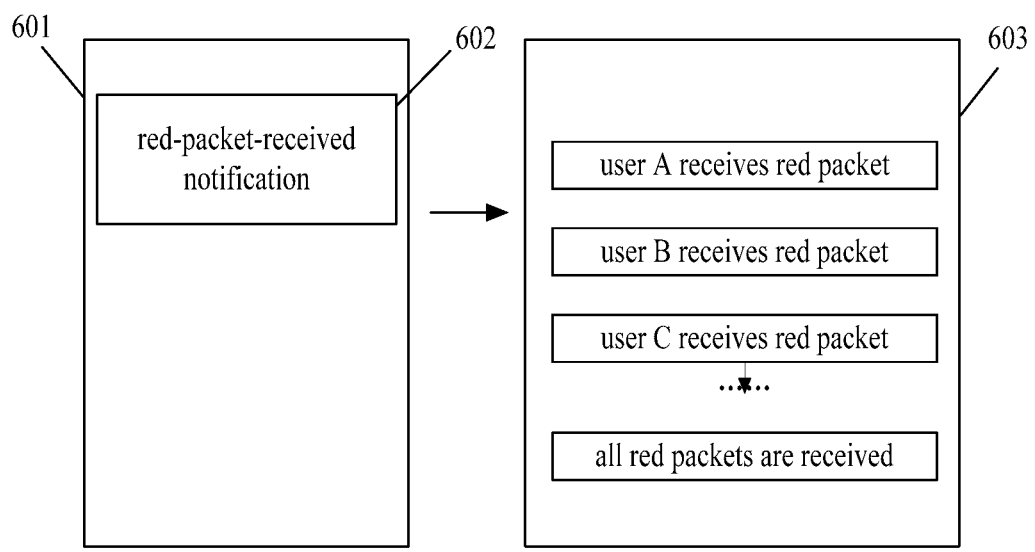
FIG. 7 is a diagram of a red-packet-received notification in a multi-stage user interface of an application scene in related art.

FIG. 7 is a diagram of a red-packet-received notification in a multi-stage user interface of an application scene in related art. The user may have logged in to the user login interface 601, receive a template message sent by the "WeChat red packet" public account, who may push the template message to a status bar or anywhere on the user login interface 601 where the pushed message may be displayed. The template message may be the red-packet-received notification, a click on which may bring the user into another page 603 with red-packet receiving status information, showing whether a red packet has been received.

Figure 8:
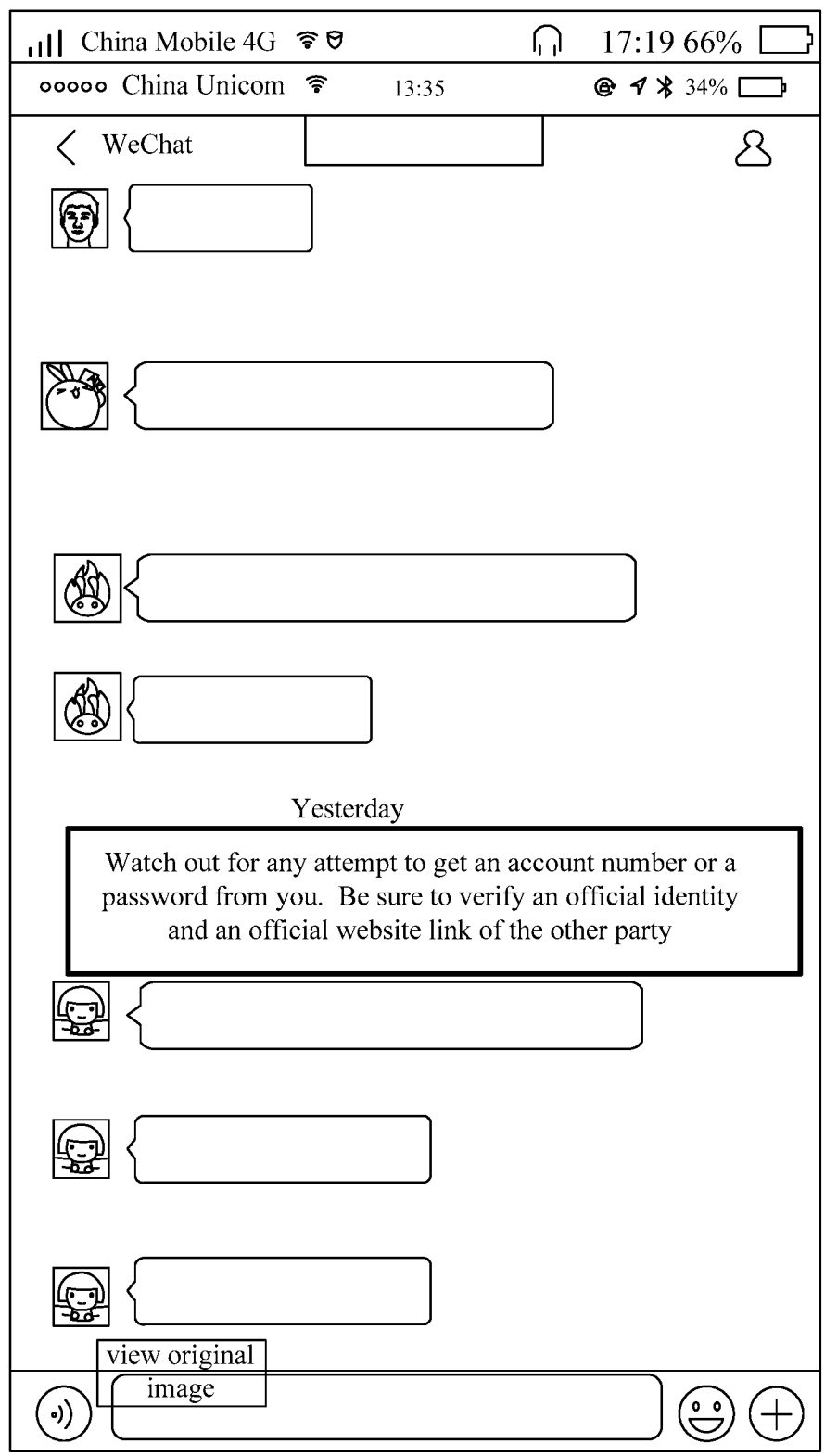
FIG. 8 is a diagram of a user interface of an application scene in related art.

FIG. 8 shows content of a system message displayed in the user login interface 603. As shown in FIG. 8, the system message includes only plain text information "watch out for any attempt to get . . . from you . . . and an official website link . . . ".

By analyzing the above content, it may be seen that: 1, in a scene of a user login page, such as a chat page, to which the user has logged in, to notify of and display details of reception of a red packet, it is required to jump from the chat scene to another page with red-packet receiving status information; 2, information has to be pushed via a third party, i.e., a "WeChat red packet" public account that may frequently send messages, which may pose a potential harassment to a user, particularly around new-year time when red packets are frequently sent and received; 3, in case where a template message is sent only for each of the first three and the last receiving events of a red packet for a group of receivers to reduce harassment of template messages sent by an public account, message reminding will be incomplete, and the user may tend to get confused. A final result of an operation may be displayed only via existing multi-stage page interaction, which requires the user to enter the page by clicking on a notification, increasing user interaction, taking up client resources. In case that information is pushed via a third party, information exchange has to be relaid, and pushed information is incomplete, both hindering fast information sharing. The more relay steps there are, the more likely an error may occur to the relaid information, and the more checking steps are required at the server to check the pushed information, taking up server resources. When information is not pushed directly by the server, credibility thereof may be undermined.

The application scene to which an embodiment herein applies may involve two aspects as follows.

In the first aspect, before a server issues a system message, a custom tag field is added to the system message, which replaces an original normal text system message. Particularly, in a red-packet scene, a system message may include three fields, i.e., <img src= . . . . . . >+system message text+<_we_custom_link_color= . . . . . . >. The first field may include a custom image for identifying a scene, including, but not limited to, the WeChat red packet scene, a Hand Q red packet scene, a scene with another social network tool, etc. The second field may include a text message. The third field may include a custom text color, in a display mode different from that of the text message in the second field. For example, the third field may be displayed in a different color, font, font size, or the like than the second field, such that the third field is displayed distinctively and may be easily told apart from the second field. The third field may include interactive information allowing the user to enter, by clicking on the interactive information, another page including an introduction to details of a WeChat red packet.

In the second aspect, a client may parse text of the custom tag in the system message sent by the server. The client may perform local search and match using a regular expression. The client may extract, from the text, information for specializing a message style. The client may then implement specialized style display according to information corresponding to the information for specializing a message style. The first field may include a custom image for identifying a scene, including, but not limited to, the WeChat red packet scene, the Hand Q red packet scene, a scene with another social network tool, etc. The second field may include a text message. The third field may include a custom text color, in a display mode different from that of the text message in the second field. For example, the third field may be displayed in a different color, font, font size, or the like than the second field, such that the third field is displayed distinctively and may be easily told apart from the second field. The third field may include interactive information allowing the user to enter, by clicking on the interactive information, another page including an introduction to details of a WeChat red packet to check details such as a number of WeChat red packets, an upper limit of a number of red packets one receiver is allowed to receive, an amount of money therein, etc.

Note that for the WeChat red packet scene, an existing WeChat system message supports but a plain text format as shown in FIG. 8. Such a system message allows no user interaction, and makes no distinction between styles of system messages in different scenes. When such a system message appears in a chat interface in the user login interface, the user cannot identify the role of this message. However, with an embodiment herein, for the WeChat red packet scene, a reconstructed new system message may be obtained by including a field of a custom tag in the system message. Thus, when the new system message appears in a chat interface in the user login interface, the user may identify the role of the message at a glance. For example, by seeing a WeChat red-packet ICON in the first field, one may know that the message relates to an application scene of a WeChat red packet instead of being a common notification. The user may further click on a control, for jumping to another page in the WeChat client, in the third field at the end of the new system message, such as a color character or bubble, displayed in a color distinctively different from that of the common plain text information in the second field of the new system message, to enter a page including an introduction to details of a red packet. With an embodiment herein, by supporting a custom message format, the constructed new system message may be better adapted to an application scene, easier to identify, and require fewer user operations. A final result may be displayed directly in a chat interface to which the user has logged in, among chat information. However, the user may identify, at first glance, the final result as a message prompt relating to a certain application scene.

Figure 9:
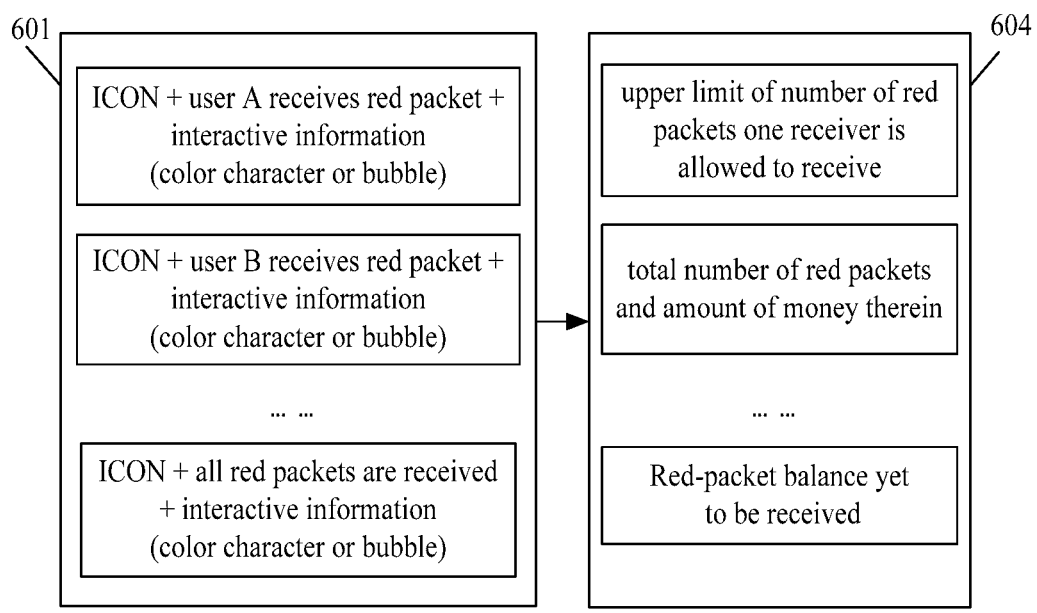
FIG. 9 is a diagram of a structure of a system message in a stage-1 user interface obtained according to an embodiment herein.
Figure 10:
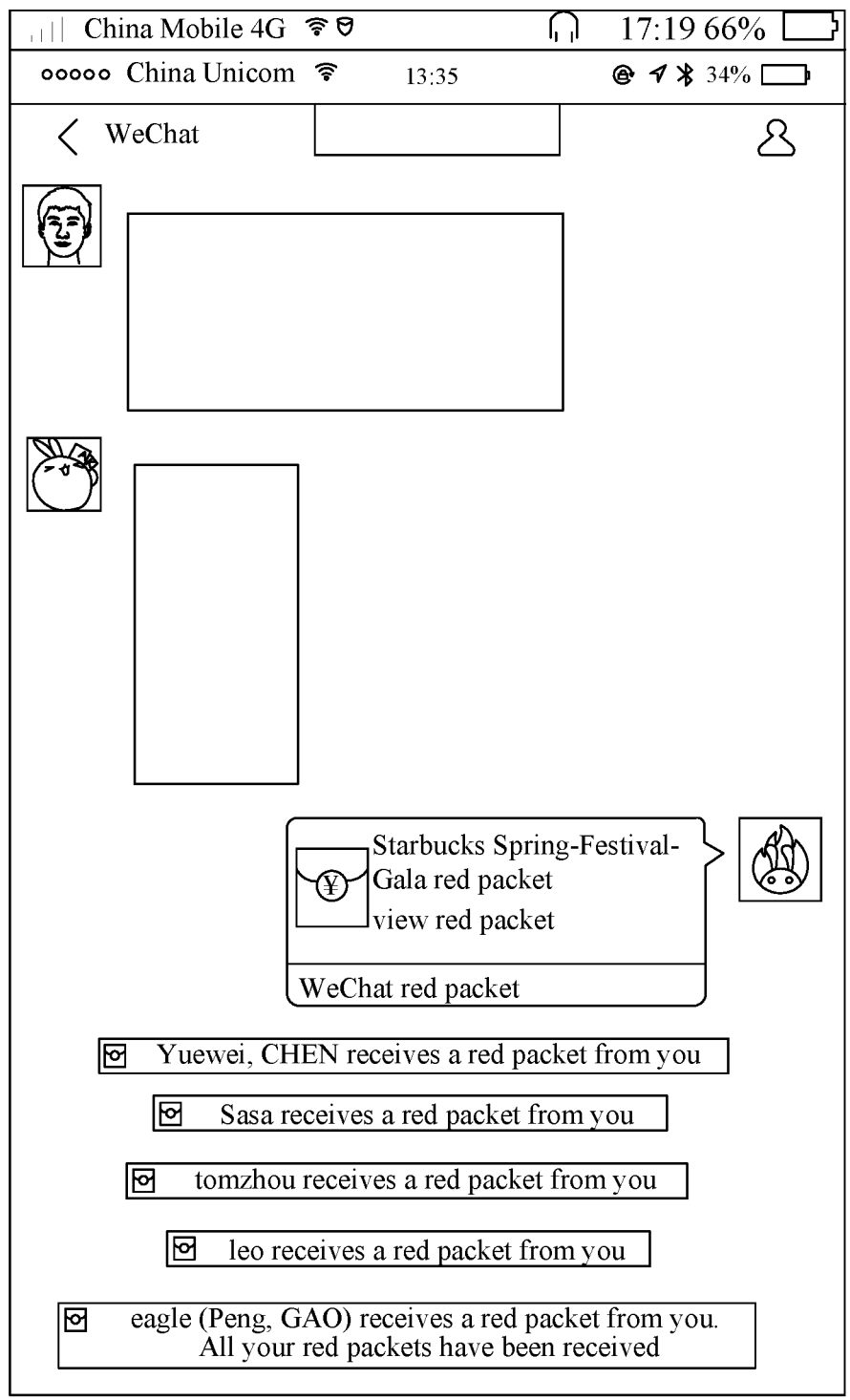
FIG. 10 is a diagram of a stage-1 user interface obtained according to an embodiment herein.

In the WeChat red packet scene, a reconstructed new system message, namely a red-packet system message, may be implemented with rich text technology to support adding a red-packet ICON to the message head to facilitate identifying a system message type by a user. Moreover, color characters such as "orange red packet" at the end of the message may allow the user to jump directly to a page including details of a red packet. The user may no longer need to find the red packet bubble, click on the bubble for details, such that once notified, in a chat scene, that a red packet has been received, the sender may know for sure, in that very chat scene, that the red packet has been received, without being required to leave the chat to check if the red packet has been received. The brand-new form of displaying a system message allows a red-packet-received notification to be displayed in a distinctively different mode than a common system message in a chat in WeChat, which is more eye-catching and creates a more comfortable atmosphere. FIG. 9 is a diagram of a structure of a system message in a stage-1 user interface obtained according to an embodiment herein. The system message in the stage-1 user interface may include three fields of a new system message parsed and displayed in a WeChat red packet scene, namely an ICON, the plain text information, and the interactive information. The new system message may be displayed in a user login interface 603. The user may enter, through a user operation on the interactive information, a page including detailed red-packet reception. Content such as shown in FIG. 9 may be displayed on the page including detailed red-packet reception. FIG. 10 is a diagram of a user interface applying to a scene according to an embodiment herein, visually illustrating what described above, which is not repeated.

An integrated module or unit according to embodiments herein, when implemented in form of a software functional module or unit and sold or used as a separate product, may be stored in a computer readable storage medium. Based on such understanding, those skilled in the art shall understand that embodiments herein may be provided as a method, a system or a computer program product. Thus, the present disclosure may take on a form of complete hardware, complete software or a combination thereof. The present disclosure may take on a form of a computer program product implemented on one or more computer available storage media containing computer available program codes. The storage media may include, but are not limited to, a U disk, a mobile hard disk, a Read-Only Memory (ROM), a disk memory, a Compact Disc (CD)-ROM, an optical memory and the like.

The present disclosure has been described with reference to a flowchart and/or a block diagram of the method, device (system) and computer program product according to embodiments herein. It will be appreciated that each flow and/or block in the flowchart and/or the block diagram and a combination of the flows and/or the blocks in the flowchart and/or the block diagram may be implemented by computer program instructions. Such computer program instructions may be provided in a general-purpose computer, a dedicated computer, an embedded processor or a processor of another programmable data processing device to generate a machine, such that an apparatus for implementing functions designated in one or more flows in the flowchart and/or one or more blocks in the block diagram may be generated via instructions executed by the computer or the processor of the another programmable data processing device.

Such computer program instructions may also be stored in a computer readable memory capable of guiding a computer or another programmable data processing device to work in a specific mode, such that a manufactured product including an instruction apparatus is generated via the instructions stored in the computer readable memory, for implementing the functions designated in one or more flows of the flowchart and/or one or more blocks of the block diagram.

Such computer program instructions may also be loaded to a computer or another programmable data processing device, such that a series of operating steps are executed on the computer or the another programmable data processing device to generate computer implemented processing, such that the instructions executed on the computer or the another programmable device provide steps for implementing functions designated in one or more flows of the flowchart and/or one or more blocks of the block diagram.

Although embodiments herein have been described, once learning the basic creative concept herein, those skilled in the art may change and modify such embodiments. Thus, the appended claims are intended to be interpreted as covering the embodiments and all changes and modifications falling within the scope of the present disclosure.

An embodiment herein may also provide a non-transitory computer-readable storage medium having stored therein computer-executable instructions that, when executed by a processor, cause the processor to execute the information processing method according to an embodiment herein.

With an embodiment herein, a server generates a system message, and issues the generated system message to a client, where the system message is parsed and directly displayed before the user, without requiring additional third-party relay before information can be displayed, thereby saving resources, improving efficiency in pushing information to a user, meeting a demand for fast direct display of a result; information may be directly received in the user login interface, and the information displayed in its final form may be viewed, without the need to receive the information by jumping from the user login interface to another page as prompted by a notification, thereby saving resources, avoiding multi-stage user operations at the client and multiple interactions between the client and the server, allowing the user to obtain a final result of an operation within a minimal amount of time.

What is claimed is:
1. An information processing method, comprising:
displaying, by a client, a chat page between a user and one or more other users in response to a first user operation,
sending, by the client in the chat page, a request for sending a gift packet to a plurality of users in the chat page;
displaying, by the client in the chat page, an operational control in response to the request for sending the gift packet, the operational control comprises data about the gift packet;
receiving, by the client in the chat page from a server, a system message sent by the server, the system message being an indication of details of receiving the gift packet by at least one user of the plurality of users in the chat page through the operational control, wherein the system message comprises text-format information and custom-format information, wherein the custom-format information comprises a user-operable interactive message and a scene-identifying image, wherein the scene-identifying image identifies a type of the system message;
respectively extracting, by the client, the text-format information and the custom-format information in the system message;

obtaining, by the client, a first parsing result by parsing the text-format information in a first parsing mode, the first parsing result being content of the text-format information;

extracting, by the client from the client, a pre-set parsing rule corresponding to a pre-set coding rule of the server, and obtaining a second parsing result by parsing the custom-format information in a second parsing mode by matching the custom-format information according to the pre-set parsing rule, the second parsing result being content of the custom-format information;

displaying, by the client, the first parsing result and the second parsing result on the chat page;

receiving, by the client, a second operation on a content of the user-operable interactive message;

jumping, by the client in response to the second operation, to another page indicated by or linked to by the content of the user-operable interactive message, wherein the another page comprising the details of responding to the gift packet by each user of the plurality of users in the chat page.

2. The method according to claim 1, wherein the displaying the first parsing result and the second parsing result on the chat page comprises:

displaying, by the client on the chat page, the content of the text-format information, the content of the information on the scene-identifying image, and the content of the user-operable interactive message obtained by parsing the system message.

3. A client, comprising:

a processor; and a memory configured for storing an instruction executable by the processor, wherein the processor is configured for:

displaying a chat page between a user and one or more other users in response to a first user operation, sending, in the chat page, a request for sending a gift packet to a plurality of users in the chat page;

displaying, in the that page, an operational control in response to the request for sending the gift packet, the operational control comprises data about the gift packet;

receiving, in the chat page from a server, a system message sent by the server, the system message being an indication of details of receiving the gift packet by at least one user of the plurality of users in the chat page through the operational control, wherein the system message comprises text-format information and custom-format information, and the custom-format information comprises a user-operable interactive message and a scene-identifying image, wherein the scene-identifying image identifies a type of the system message;

respectively extracting the text-format information and the custom-format information in the system message;

obtaining a first parsing result by parsing the text-format information in a first parsing mode, the first parsing result being content of the text-format information;

extracting, from the client, a pre-set parsing rule corresponding to a pre-set coding rule of the server, and obtaining a second parsing result by parsing the custom-format information in a second parsing mode by matching the custom-format information according to the pre-set parsing rule, the second parsing result being content of the custom-format information; and displaying the first parsing result and the second parsing result on the chat page;

receiving a second operation on a content of the user-operable interactive message; and jumping, in response to the second operation, to another page indicated by or linked to by the content of the user-operable interactive message, wherein the another page comprising the details of responding to the gift packet by each user of the plurality of users in the chat page.

4. The client according to claim 3, wherein the processor is further configured for:

displaying, on the chat page, the content of the text-format information, the content of the information on the scene-identifying image, and the content of the user-operable interactive message obtained by parsing the system message.

5. An information processing method, comprising:

receiving, by the server, a response when a gift packet is received by a user through an operational control;

acquiring, by the server, content of the text-format information, and generating the text-format information in a first coding mode corresponding to a first parsing mode;

acquiring, by the server, content of the custom-format information, extracting from the server, a pre-set coding rule corresponding to a pre-set parsing rule, and generating the custom-format information in a second coding mode corresponding to a second parsing mode;

generating, by the server, a system message; wherein the system message comprises the content of the text-format information and the content of the custom-format information capable of being displayed at the client, and the custom-format information comprises a user-operable interactive message and a scene-identifying image, wherein the scene-identifying image identifies a type of the system message; and sending, by the server, the system message to the client, such that the client parses the system message, and displays the parsed system message in a chat page, wherein the client is jumped to another page by clicking on the user-operable interactive message.

6. A server, comprising:

a processor; and a memory configured for storing an instruction executable by the processor, wherein the processor is configured for:

receiving a response when a request for sending a gift packet is received by a user through an operational control;

acquiring content of the text-format information, and generating the text-format information in a first coding mode corresponding to a first parsing mode;

acquiring content of the custom-format information, extracting from the server, a pre-set coding rule corresponding to a pre-set parsing rule, and generating the custom-format information in a second coding mode corresponding to a second parsing mode;

generating a system message, wherein the system message comprises the content of the text-format information and the content of the custom-format information capable of being displayed at the client, and the custom-format information comprises a user-operable interactive message and a scene-identifying image, wherein the scene-identifying image identifies a type of the system message; and sending the system message to the client, such that the client parses the system message, and displays the parsed system message in a chat page, wherein the client is jumped to another page by clicking on the user-operable interactive message.

7. A non-transitory computer-readable storage medium having stored therein computer-executable instructions that, when executed by a processor, cause the processor to execute at least one of an information processing method applying to a client and an information processing method applying to a server, wherein the information processing method applying to the client comprises:

displaying a chat page between a user and one or more other users in response to a first user operation, sending, in the chat page, a request for sending a gift packet to a plurality of users in the chat page;

displaying, in the chat page, an operational control in response to the request for sending the gift packet, the operational control comprises data about the gift packet;

receiving, in the chat page from a server, a system message sent by the server, the system message being an indication of details of receiving the gift packet by at least one user of the plurality of users in the chat page through the operational control, wherein the system message comprises text-format information and custom-format information, wherein the custom-format information comprises a user-operable interactive message and a scene-identifying image, wherein the scene-identifying image identifies a type of the system message;

respectively extracting the text-format information and the custom-format information in the system message;

obtaining a first parsing result by parsing the text-format information in a first parsing mode, the first parsing result being content of the text-format information;

extracting, from the client, a pre-set parsing rule corresponding to a pre-set coding rule of the server, and obtaining a second parsing result by parsing the custom-format information in a second parsing mode by matching the custom-format information according to the pre-set parsing rule, the second parsing result being content of the custom-format information; and displaying the first parsing result and the second parsing result on the instant chat interaction interface page;

receiving a second operation on a content of the user-operable interactive message; and jumping, in response to the second operation, to another page indicated by or linked to by the content of the user-operable interactive message, wherein the another page comprising the details of responding to the gift packet by each user of the plurality of users in the chat page;

wherein the information processing method applying to the server comprises:

receiving a response when a gift packet is received by a user through an operational control;

acquiring content of the custom-format information, extracting from the server, a pre-set coding rule corresponding to a pre-set parsing rule, and generating the custom-format information in a second coding mode corresponding to a second parsing mode;

generating a system message, wherein the system message comprises the content of the text-format information and the content of the custom-format information capable of being displayed at the client, and the custom-format information comprises a user-operable interactive message and a scene-identifying image, wherein the scene-identifying image identifies a type of the system message; and sending the system message to the client, such that the client parses the system message, and displays the parsed system message in a chat page, wherein the client is jumped to another page by clicking on the user-operable interactive message.

* * * * *